United States Patent Office 2,974,113
Patented Mar. 7, 1961

2,974,113

METHOD FOR IMPROVING THE OZONE RESISTANCE OF STEAM CURED BUTYL RUBBER

Walter L. Dunkel, Fanwood, Robert F. Neu, Westfield, and Richard R. Phelan, Nixon, N.J., assignors to Esso Research and Engineering Company, a corporation of Delaware No Drawing. Filed Oct. 9, 1957, Ser. No. 689,062

6 Claims. (Cl. 260—28.5)

The present invention relates to a process for curing extruded rubber items and more particularly to the surface curing of extruded butyl rubber items with the utilization of an accelerator dip.

An object of this invention is to obtain a cured rubber which will be better able to withstand ozone weathering conditions.

In the past there has been a considerable problem concerning the effect that ozone has upon natural or synthetic rubbers, even butyl rubber which has very low unsaturation. The small amount of ozone that is present in the atmosphere is sufficient to cause cracking and deterioration of rubber. Therefore, not only will the life of a rubber product be shortened, but a safety hazard may occur, through electric insulation performance. Considerable research has been performed in conjunction with this problem and presently there are two methods employed to increase the ozone resistance of a given rubber.

The first method is to add wax to the rubber compound. Since wax is not soluble in rubber, it will tend to egress to the surface of the material. Therefore, a physical barrier is formed against the ozone. However, the limitation of this procedure is as follows: wax will wear off and, although more wax will come to the surface, there may be a period of time when the rubber is exposed to ozone. It should also be noted that, if the rubber is stretched, the wax coating will crack and the ozone will come in contact with the rubber.

The second method used is to add anti-ozonants, such as phenylene diamine, to the rubbery compound. Normally, ozone breaks down to form free radicals which attack the double bonds that are present in the rubber chain. This results in deterioration. However, anti-ozonants, if present in the rubber, react with these free radicals. Since fewer double bonds are attacked, deterioration is decreased. This process has the following limitation: rubber with anti-ozonant additives will stain certain items it comes in contact with. This is exemplified where weather seals for automobile windows, containing anti-ozonants, stain the painted surface of the vehicle.

The present invention may be applied to natural or synthetic rubbers, but it has been found especially effective for butyl rubber. The high unsaturation rubbery polymers (e.g., iodine number of 250 to 400) do not show the improvement in ozone resistance, observed with the butyl rubber which has an iodine number less than 50 and generally about 1 to 10. This is because these other rubbers have a large number of reactive double bonds; therefore, small changes in the state of vulcanization or cross-linking do not appreciably alter ozone resistance. However, in butyl rubber, there are considerably fewer double bonds and consequently, the increase in vulcanizate cross-linking has a substantial overall effect.

In this invention, butyl rubber, compounded with additives as carbon black, zinc oxide, plasticizers, and accelerators, is extruded into the desired form. It is then passed through an accelerator dip and subsequently cured. Unexpected results occur through the utilization of this accelerator dip as indicated herebelow.

The butyl rubber polymer is prepared by reacting 70 to 99.5 parts by weight, preferably 85 to 99.5, of an isoolefin with 30 to 0.5 parts by weight, preferably 15 to 0.5, of multiolefin. The isoolefin, in general is a $C_4$ to $C_7$ compound, an isobutylene or 2-methyl-1-butene. The multiolefin, in general, is a $C_4$ to $C_{10}$ conjugated diolefin such as isoprene, butadiene, or piperylene. The preferred polymer is obtained by reacting 95 to 99.5% by weight of isobutylene with 1 to 5% by weight of isoprene.

Mixture of monomers, preferably with 1 to 5 volumes of inert diluent, e.g., methyl chloride, should be cooled to a temperature between 0 and $-200°$ C. and it is preferred that the temperature range be between $-60°$ and $-130°$ C. The cold mixture is polymerized by the addition of a Friedel-Crafts catalyst, preferably an aluminum halide catalyst in a liquid or dissolved form, in conjunction with vigorous agitation. The amount of catalyst is generally about 0.15 to 1.0% by weight of the mixed olefins.

The polymerization reaction is rapid and the polymer precipitates out of the solution in the form of a slurry or flocculent white solid. The polymer, which is recovered and dried, has a Staudinger molecular weight between 20,000 and 150,000, preferably 45,000 to 60,000; and an iodine number between 0.5 and 50, preferably between 1 and 15. The preparation of this copolymer is promulgated in U.S. Patent No. 2,356,128 which may be used as a reference for further details.

In this invention, before the polymer is shaped or extruded, conventional compounding and curing agents may be added to obtain certain results. These could include plasticizers as oils, petrolatum, and wax; reinforcing and filling agents as carbon black, pigments, anti-oxidants, and anti-ozonants, etc.; and accelerators. Typical accelerators are Tuads (tetramethyl thiuram disulfide), Tellurac (tellurium diethyl dithiocarbamate), Arazate (zinc dibenzyl dithiocarbamate), and sulfur. These compounds may be added to the polymer by Banbury mixing followed by Mill mixing. This is further described in Example I.

The butyl rubber, with or without the above compounds, may be shaped in any known manner, although an extrusion process may be preferred, as extruding into shapes of: window sealing strips, hose, etc. The shaped or extruded rubber is then passed, preferably continuously, through an accelerator dip which is the applicants' invention and novel contribution to the art. The components of this dipping process are one or more accelerators dispersed in solution. The number and type of accelerators chosen are dependent upon the desired result. The preferred liquid medium or solvent in water, mainly because it will evaporate during curing, will leave no residue behind, and is safe to work with. The aqueous slurry, generally used, consists of 5 to 50% by weight of common butyl rubber accelerators. The temperature and pressure may vary over a wide range, e.g., 0 to 100° C. and 1 to 10 atmospheres, but about room temperature and about atmospheric pressure are the preferred conditions. The shaped or extruded butyl rubber should remain in contact with the solution for about 0.1 to 10 minutes to insure that its surface has been completely coated, but normally this should be accomplished in 0.1 to 1 minute. In conjunction with this process, continuous agitation of the slurry should be employed by mechanical means.

The butyl rubber polymer, after it has passed through the accelerator dip, can be cured by any known means. The one most commonly used is steam curing in an autoclave. The temperature for carrying out this curing process will generally be between 100° F. and 400° F.;

time between 1 minute and 600 minutes; pressure will be dependent upon the former condition.

Thus, a new vulcanized butyl rubber has now been prepared. The novelty is illustrated by the unexpected improvement in ozone resistance without the limitations previously encountered. In this invention, in contrast with the wax additive polymer, the surface protection will not wear off or crack. The products formed according to this invention will not leave a stain on other items, which is a limitation for the procedure of adding anti-ozonants to the butyl rubber.

The surface of these new products is unique. After passing the extruded item through the accelerator slurry according to this invention, a layer of accelerators is present on the surface of the polymer. Upon curing, more of the surface double bonds are cross-linked; thus the ozone resistance is increased on the surface where it is most important.

It is known, to one familiar with the art, that butyl rubber, with its low unsaturation, exhibits excellent resistance to ozone. However, the high surface cure of the present invention has produced a butyl rubber vulcanizate which is even more superior to other rubber products for resisting ozone weathering. With this modification, butyl rubber can be used more safely and more efficiently in many manufactured products. For example, an item can now be produced which will have increased safety features, e.g., rubber covered electric wire, due to the retardation of cracks and deterioration. Such rubber products as weather seals for automobile windows, garden hoses, rubber coating for wire and cable may be more efficiently used due to the longer life that will result from this invention.

The following examples are submitted to illustrate and not to limit this invention.

EXAMPLE I 100 parts by weight of Enjay butyl 035 were dumped into a Banbury mixer. This commercial polymer is an isobutylene-isoprene copolymer formerly known as GR-I-35. 90 parts of SRF-black, which is a commercial furnace carbon black, were added. Then 5 parts of zinc oxide were added, followed by two parts of petrolatum. Two parts of wax were next added. These components were mixed for approximately 7 to 8 minutes at a temperature of about 275° to 300° F. The following accelerators were added in the following proportions: 1.5 parts of tetramethyl thiuram disulfide, 1.0 part of tellurium diethyl dithiocarbamate, 3.0 parts of sulfur. After these components were thoroughly mixed, the material was passed through an extruder having an automotive weather seal cross-section die. The shaped or extruded compound was then passed through an accelerator dip. This particular dip consists of 100 grams of tellurium diethyl dithiocarbamate plus 100 grams of tetramethyl thiuram disulfide slurried with 1,000 cc. of water. After a few minutes, the polymer was steam cured in an autoclave at 320° F. and a pressure of 80 p.s.i. for 40 minutes and then tested for ozone resistance in comparison with an undipped control sample.

The physical properties obtained from a pressure cured pad (cured 10′ @ 320° F.) are:

| | |
|---|---|
| Tensile, p.s.i. | 1360 |
| Elongation, percent | 615 |
| 100% modulus, p.s.i. | 290 |
| 300% modulus, p.s.i. | 875 |
| Shore "A" hardness | 70 |
| Crescent tear, p.s.i., R.T. | 310 |

The results of this invention are listed below:

*Ozone resistance (tubes cured 40′ @ 80 p.s.i.)*
*100 p.p.h.m., 100° F., 180° bend, 24 hr. rating*

| Method: | Rating |
|---|---|
| Undipped | 2 |
| Dipped | 0 |

Rating system:
- 0—No cracks visible at 2× magnification
- 1—Cracks visible at 2× magnification but not with the naked eye
- 2—Cracks visible to naked eye
- 3—Severe cracking

EXAMPLE II

The process and procedure for this example is the same as in Example I. However, the following material and proportions were used in this cured compound:

| Ingredients: | Parts by weight |
|---|---|
| Enjay butyl 035 (formerly GR-I-35) | 100 |
| SRF black | 90 |
| Zinc oxide | 5 |
| Petrolatum | 2 |
| Tetramethyl thiuram disulfide | 1.0 |
| Zinc dibenzyl dithiocarbamate | 2.0 |
| Sulfur | 3.0 |

The physical properties obtained from a pressure cured pad (cured 10′ @ 320° F.) are:

| | |
|---|---|
| Tensile, p.s.i. | 1320 |
| Elongation, percent | 625 |
| 100% modulus, p.s.i. | 260 |
| 300% modulus, p.s.i. | 800 |
| Shore "A" hardness | 75 |
| Crescent tear, p.s.i., R.T. | 323 |

The results of this invention are listed below:

*Ozone resistance (tubes cured 40′ @ 80 p.s.i.)*
*100 p.p.h.m., 100° F., 180° bend, 24 hr. rating*

| Method: | Rating |
|---|---|
| Undipped | 2 |
| Dipped | 0 |

Rating system:
- 0—No cracks visible at 2× magnification
- 1—Cracks visible at 2× magnification but not with the naked eye
- 2—Cracks visible to naked eye
- 3—Severe cracking The above data in Examples I and II show that the ozone resistance is increased considerably by passing the polymer through the accelerator dip.

Having thus set forth the general nature and embodiments of the present invention, the true scope is now particularly pointed out in the appended claims.

What is claimed is:

1. A process which comprises preparing a rubbery polymer of 70 to 99.5 parts of an isoolefin with 30 to 0.5 parts of a multiolefin; compounding said rubbery polymer with 0 to 50% of a plasticizer selected from the group consisting of oils, petrolatum, and wax; 0 to 500% of a filling agent selected from the group consisting of carbon black, and pigments; small amounts of anti-oxidants, and anti-ozonants; and an accelerator selected from the group consisting of tetramethyl thiuram disulfide, tellurium diethyl dithiocarbamate, zinc dibenzyl dithiocarbamate, sulfur, and mixtures thereof; passing said compounded polymer continuously through an aqueous slurry containing 5 to 50% by weight of an accelerator selected from the group consisting of tetramethyl thiuram disulfide, tellurium diethyl dithiocarbamate, zinc dibenzyl dithiocarbamate and mixtures thereof; subsequently curing said compounded polymer with said slurry on its surface at a temperature between 100 and 400° F. to provide a vulcanizate therefrom with increased ozone resistance.

2. A composition of matter comprising a butyl rubber polymer of 70 to 99.5% of an isoolefin with 0.5 to 30% of a multiolefin which has been compounded with 0 to 50% of a plasticizer selected from the group consisting of oils, petrolatum, and wax; 0 to 50% of a filling agent selected from the group consisting of carbon black, pigments and anti-oxidants; and small amounts of anti-ozonants; and an accelerator selected from the group consisting of tetramethyl thiuram disulfide, tellurium diethyl dithiocarbamate, zinc dibenzyl dithiocarbamate, sulfur, and mixtures thereof; and which has been passed continuously through an aqueous slurry containing 5 to 50% by weight of an accelerator selected from the group consisting of tetramethyl thiuram disulfide, tellurium diethyl dithiocarbamate, zinc dibenzyl dithiocarbamate, and mixtures thereof; said composition having been subsequently cured with said slurry on its surface at a temperature between 100 and 400° F. to provide a vulcanizate therefrom with increased ozone resistance.

3. The process of claim 1 in which the butyl rubber is a copolymer of isobutylene and a conjugated multiolefin.

4. The process of claim 1 in which the butyl rubber is a copolymer of 85 to 99.5% of isobutylene and 15 to 0.5% of isoprene.

5. A process which comprises preparing a rubbery copolymer of 85 to 99.5% of isobutylene with 0.5 to 15% isoprene; compounding 100 parts of said rubbery copolymer with 90 parts of carbon black, 5 parts of zinc oxide, 2 parts of petrolatum, 1.5 parts of tetramethyl thiuram disulfide, 1.0 part of tellurium diethyl dithiocarbamate, and 3.0 parts of sulfur; passing said compounded polymer continuously through an aqueous slurry comprising 100 grams of telurium diethyl dithiocarbamate, 100 grams of tetramethyl thiuram disulfide, and 1000 cc. of water; and subsequently curing said rubbery polymer with said slurry thereon at a temperature between 320° F. to provide a vulcanizate therefrom with increased ozone resistance.

6. A composition of matter comprising a butyl rubber polymer of 85 to 99.5% of isobutylene with 0.5 to 15% isoprene which has been compounded with 90 parts of carbon black, 5 parts of zinc oxide, 2 parts of wax, 1.5 parts of tetramethyl thiuram disulfide, 1.0 part of tellurium diethyl dithiocarbamate, and 3.0 parts of sulfur; and which has been passed continuously through an aqueous slurry comprising 100 grams of tellurium diethyl dithiocarbamate, and 100 grams of tetramethyl thiuram disulfide and 1000 cc. of water; said composiiton having been subsequently cured with said slurry on its surface at a temperature of 320° F. to provide a vulcanizate therefrom with increased ozone resistance.

References Cited in the file of this patent

UNITED STATES PATENTS 2,006,184    Schrauth _____ June 25, 1935

FOREIGN PATENTS 151,747    Australia _____ Nov. 9, 1950

OTHER REFERENCES

Whitby: "Synthetic Rubber," Wiley & Sons, N.Y. (1954), p. 872.